US00RE37973E

(19) United States
(12) Reissued Patent
Gravert et al.

(10) Patent Number: US RE37,973 E
(45) Date of Reissued Patent: Feb. 4, 2003

(54) PROCESS AND DEVICE FOR SURFACE TREATMENT OF STRIPS WITH LIQUIDS

(75) Inventors: Peter Gravert, Vienna (AT); Gunther Hiden, St. Stefan o.L. (AT)

(73) Assignee: Andritz AG, Graz (AT)

(21) Appl. No.: 09/742,185

(22) Filed: Dec. 22, 2000

Related U.S. Patent Documents

Reissue of:
(64) Patent No.: 5,853,495
Issued: Dec. 29, 1998
Appl. No.: 08/811,924
Filed: Mar. 5, 1997

(30) Foreign Application Priority Data

Mar. 14, 1996 (AT) ..... 478/96

(51) Int. Cl.[7] ..... B08B 1/02; B08B 3/04
(52) U.S. Cl. ..... 134/15; 134/64 R; 134/122 R
(58) Field of Search ..... 134/15, 64 R, 134/122 R

(56) References Cited

U.S. PATENT DOCUMENTS 4,850,378 A * 7/1989 Mattiussi ..... 134/15
4,928,717 A * 5/1990 Osarek et al. ..... 134/64 R
5,116,447 A * 5/1992 Kimura et al. ..... 134/122 R
5,282,485 A * 2/1994 Hirai et al. ..... 134/64 R
5,634,481 A * 6/1997 Legoupil ..... 134/122 R
5,853,495 A * 12/1998 Gravert et al. ..... 134/15

* cited by examiner

*Primary Examiner*—Randy Gulakowski
*Assistant Examiner*—Saeed Chaudhry
(74) *Attorney, Agent, or Firm*—Roylance, Abrams, Berdo & Goodman, L.L.P.

(57) ABSTRACT

A device for surface treatment of continuously moving strip, particularly for pickling rolled metal strip, includes a trough-shaped tank containing a treating liquid bath. The trough includes a panel mounted therein and submerged in the liquid, and aligned approximately parallel to the strip. The panel divides the treatment bath into a treatment area underneath the panel through which the strip being treated passes and a return flow sector for the liquid above the panel. The treating liquid is collected in the return flow sector at a discharge end of the trough and is directed along the return flow sector to a receiving end of the trough.

46 Claims, 5 Drawing Sheets

PROCESS AND DEVICE FOR SURFACE TREATMENT OF STRIPS WITH LIQUIDS

Matter enclosed in heavy brackets [ ] appears in the original patent but forms no part of this reissue specification; matter printed in italics indicates the additions made by reissue.

FIELD OF THE INVENTION

The present invention relates to a process and device for contacting the surface treatment of a strip material with a liquid. More particularly, the invention is directed to a trough for treating a rolled metal strip with a pickling solution.

BACKGROUND OF THE INVENTION

According to the state of the art, strip processing plants, such as those used for metal pickling plants, using liquid baths are designed with each individual bath measuring approximately 100 to 200 mm deep and normally 10 to approximately 40 m long. The reaction speed of the treatment medium on the surface of the strip material being processed is improved by reducing the liquid boundary layer on the strip surface. To reduce the liquid boundary layer, the current trend is now towards shallower liquid baths. This leads to greater bath turbulence due to the higher Reynolds number and a reduction in the liquid boundary layer due to the increased shearing effect.

The lower limit of the average depth of the bath is dependent on the speed of the strip material passing through the bath. Due to the dragging effect of the moving strip, the liquid treatment medium is carried along in the treatment tank in the same direction as the advancing direction of the strip. This results in a slant or incline of the liquid surface level with a corresponding increase in the depth of the bath at the strip exit point and the equivalent reduction in the depth of the bath at the strip entry point. At higher speeds (e.g., above a strip speed of approximately 200 m/min with 200 mm mean depth and 20 m length of the bath), the liquid is carried away by suction from the strip entry point into the treatment bath such that the distance over which the strip is submerged in the treatment medium is shorted accordingly. This results in the length of the treatment bath and the tank not being fully utilized. As a result, the mean liquid level of the bath must be raised to avoid the strip entry area being emptied by the suction from the advancing strip. The optimum efficiency of a treatment bath with an open top surface is thus a compromise between the shortened bath length as a result of the draft effect and the reduced pickling effect because of the greater mean depth of the treating liquid bath.

One example of a bath having a structure to maintain a small mean bath depth at high speeds is by the use of a closed treatment channel. The depth of the bath is thus limited to the height of the treatment channel. In order to prevent the liquid from being drawn or sucked out of the treatment channel, the strip exit point from the treatment channel must be sealed hydrodynamically against the back-up pressure of the dragging effect. An example of this type of structure and process is disclosed in, for example, EP 0 655 519 A1. The hydrodynamic seal requires a much higher energy input compared to the treatment baths with an open top surface. Furthermore, the high velocity and head pressure caused by being sealing off at the strip exit point of the treatment channel makes it more difficult to provide the required supply of fresh treatment medium. The closed channel requires more energy to feed the fresh liquid treatment medium into the channel. Formation of a closed channel reduces evaporation of the liquid treatment medium and thus reduces the amount of energy needed to maintain the treatment temperature. This, however, it not an advantage, particularly in pickling plants which recover the acid by heat decomposition using additional equipment. The quantity of liquid that is not evaporated in the processing tank must be removed by other processes thereby increasing the energy consumption for recovery of the acid.

Accordingly, there is a continuing need in the industry for an improved process and apparatus for treating a moving strip in a liquid bath.

SUMMARY OF THE INVENTION

A primary object of this invention is to improve the efficiency of a treatment bath with an open top surface thereby avoiding the disadvantages of a closed treatment channel.

A further object of the invention is to provide a panel mounted above a strip being treated and submerged in the liquid in a treatment bath which divides the treatment bath into a treatment area underneath the panel and a return flow sector for the liquid above the panel.

Another object of the invention is to provide a process and apparatus for returning the liquid from the discharge end of a treatment bath tank to a strip material receiving end of the tank.

A further aspect of the invention is to provide a trough containing a liquid for treating a sheet material where the trough has a small bath depth.

Another aspect of the invention is to provide a trough containing a liquid treating bath for treating a sheet material where the movement of the sheet material through the treating path produces mixing of the bath and circulates the bath from the one end of the other.

A further aspect of the invention is to provide a trough containing a liquid for treating a sheet material having a divider defining a treating zone and a liquid return zone, and having openings in the divider to provide liquid communication between the treating and return zones.

Another aspect of the invention is to provide a trough containing a liquid for treating a sheet material having a divider forming a treating zone and a liquid return zone where the treating and return zones are in fluid communication at a receiving end and a discharge end of the trough.

Another object of the invention is to provide a trough for contacting a continuously moving sheet material through a liquid bath using a small bath depth.

A further object of the invention is to provide a trough for contacting a continuously moving sheet material with a liquid bath in a manner to maximize the usable length of the trough.

The objects of the invention are basically attained by providing an apparatus for immersing a strip material in a liquid bath, the apparatus comprising: a trough having a longitudinal dimension with a bottom wall, first and second side walls, a strip material receiving end and a strip material discharge end, the trough being dimensioned to receive a treating liquid and contain a liquid bath; and at least one panel mounted within the trough and submerged in the liquid bath, the at least one panel having a bottom surface spaced from the bottom wall of the trough for defining a contact zone in the trough, the at least one panel further having a top surface defining a return zone for receiving liquid from the discharge end of the trough and directing the liquid along the top surface from the discharge end to the receiving end of the trough.

The objects of the invention are also attained by providing an apparatus for immersing a strip material in a liquid bath, the apparatus comprising: a trough containing a liquid bath, the trough having a longitudinal dimension, first and second side walls, a bottom wall, and a first end wall at a strip material receiving end and a second end wall at a discharge end for the strip material; a divider positioned in the trough defining a contact zone and a liquid return zone for directing liquid from the discharge end to the receiving end of the trough; and a feed device for feeding strip material from the receiving end to the discharge end through the contact zone.

The objects of the invention are further attained by providing a process for contacting a strip material with a liquid bath, comprising the steps of: feeding a strip material to a receiving end to a discharge end of a trough, wherein the trough contains a liquid bath between the receiving and discharge ends, the trough including a divider defining a strip material contact zone in a bottom section of the trough and a liquid return zone in a top section of the trough; conveying the strip material through the contact zone and creating a current of the liquid through the contacting zone from the receiving end to the discharge end; directing the current of liquid at the discharge end to the return zone and returning the liquid to the receiving end; and discharging the material strip from the discharge end of the trough.

These and other objects of the invention will become apparent from the detailed description of the invention which taken in conjunction with the annexed drawings disclose preferred and various embodiments of the invention.

BRIEF DESCRIPTION OF THE DRAWINGS

Referring to the drawings which form part of this original disclosure, in which.

DETAILED DESCRIPTION OF THE INVENTION

The present invention is directed to a process and apparatus for contacting a sheet material in a liquid bath using a minimum amount of liquid in the bath. The invention is particularly directed to an apparatus for treating a continuously moving strip of sheet material through a liquid bath in a manner to maximize contact time of the sheet material with the liquid bath. The apparatus produces continuous movement of the liquid bath to provide a continuous supply of fresh treating liquid on the surface of the sheet material being treated.

Figure 1:
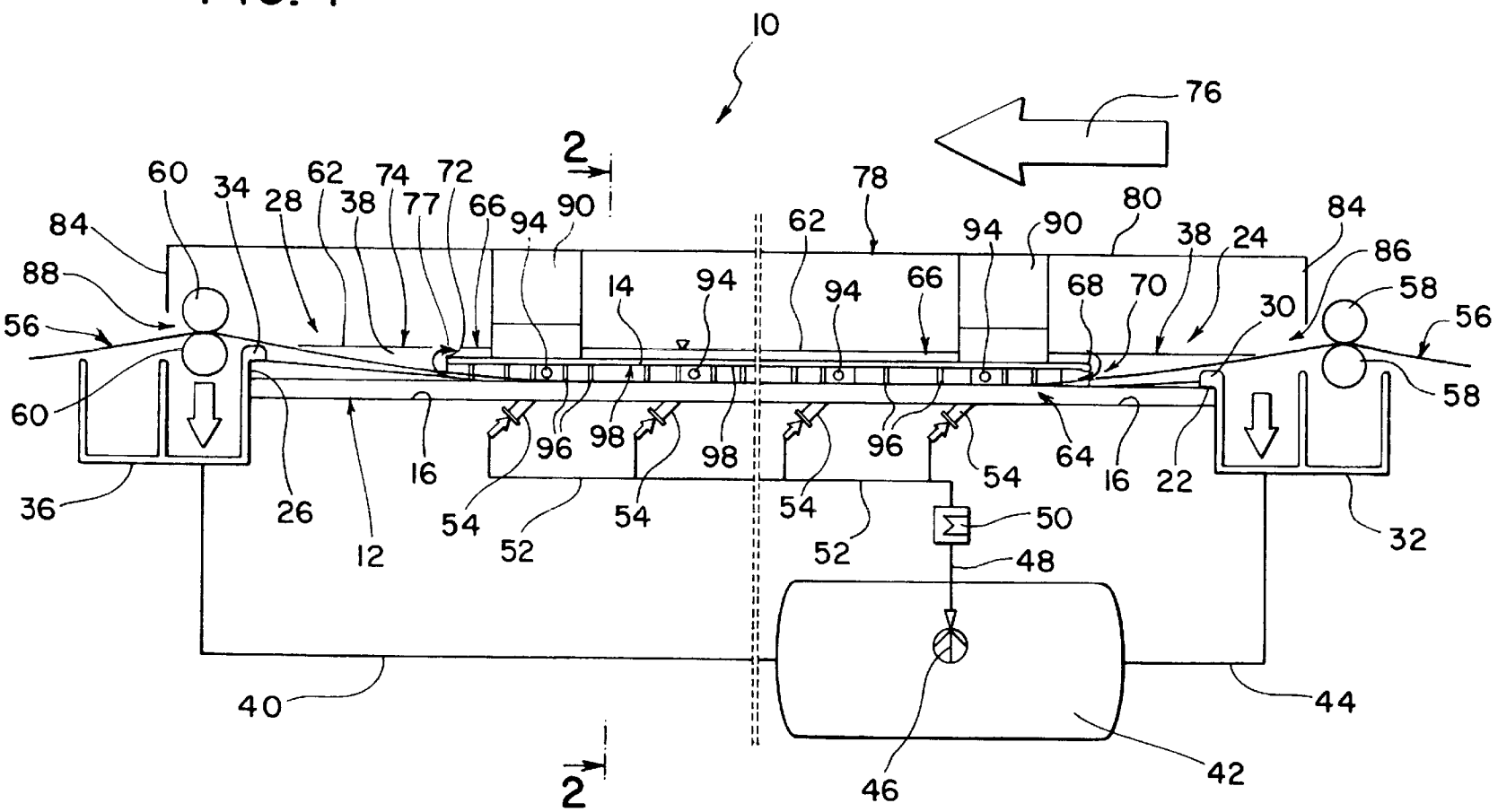
FIG. 1 is a cross-sectional side view of the apparatus in a first embodiment of the invention showing the liquid treatment tank and divider.
Figure 2:
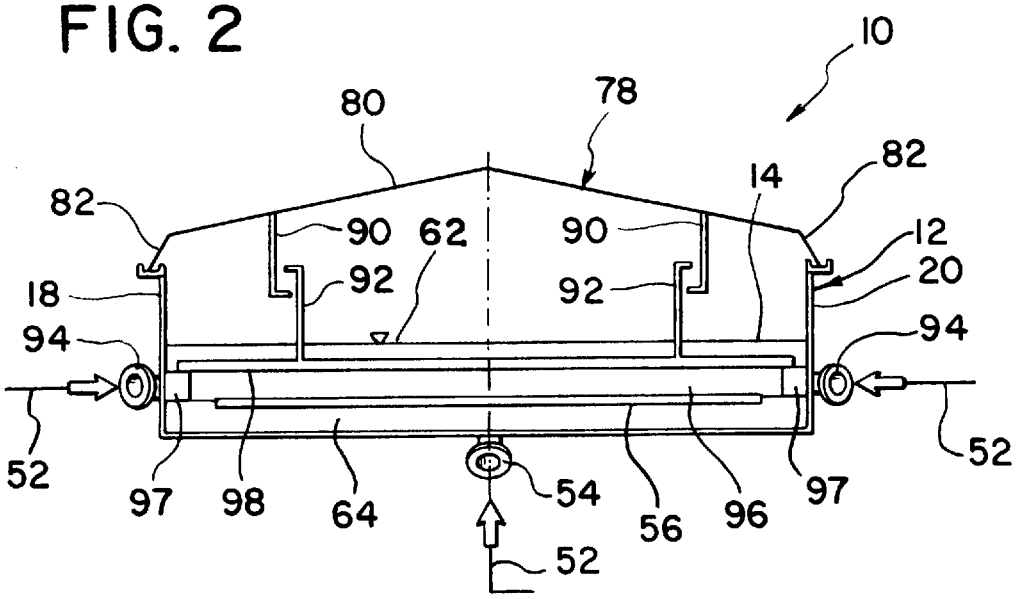
FIG. 2 is a cross-sectional end elevational view of the apparatus of FIG. 1.

Referring to FIGS. 1 and 2, the apparatus 10 is a liquid treatment tank which includes a trough 12 and a divider 14. Trough 12 is generally a rectangular shape having a longitudinal dimension. Trough 12 has a bottom wall 16, a pair of opposing side walls 18, 20, a first front end wall 22 at a receiving end 24 and a second rear end wall 26 at a discharge end 28. An overflow block 30, which is typically made of stone or other chemically resistant material, is positioned at the receiving end 24 on the front wall 22 for directing liquid overflow into an overflow collecting trough 32. A similar overflow block 34 is positioned at the discharge end 28 of trough 12 to direct liquid from trough 12 into an overflow trough 36. Overflow blocks 30 and 34 define the upper limit of the depth of the liquid bath 38 in trough 12 and are dimensioned to maintain a desired liquid bath depth.

A pipe 40 is connected to overflow collection trough 36 to carry the overflow liquid to a collection and circulating tank 42. A similar pipe 44 is connected to overflow collection trough 32 to carry overflow liquid to circulating tank 42. A pump 46 circulates the liquid from circulation tank 42 through a pipe 48 to a heat exchanger 50 and through pipe 52 to injection nozzles 54.

In the embodiment of FIG. 1, several injection nozzles 54 are provided to inject the liquid through the bottom wall 16 of trough 12 in a substantially upward direction into liquid bath 38. In preferred embodiments, injection nozzles 54 direct the injected liquid at an angle toward the receiving end 24 of trough 12. Nozzles 54 preferably inject the treating liquid with sufficient force to provide mixing and turbulence to liquid bath 38 and to direct fresh treating liquid directly into contact with the sheet material being treated.

Trough 12 is particularly suitable for contacting an elongated sheet or strip material 56 by continuously conveying the strip material 56 through the liquid bath 38 from the receiving end 24 to the discharge end 28 of trough 12. In the embodiment of FIG. 1, strip material 56 is fed from a suitable supply (not shown) between a pair of pinch rollers 58 into liquid bath 38 at the receiving end 24 and is directed below divider 14. Strip material 56 is carried through liquid bath 38 under divider 14 to discharge end 28 and to pinch rollers 60 where the strip material 56 exits trough 12. Excess treating liquid on strip material 57 is removed by pinch rollers 60 so that the liquid falls into overflow trough 36.

Divider 14 generally has a substantially flat panel shape and is positioned below the surface 62 of liquid bath 38. Divider 14 defines a liquid contact and treatment zone 64 between divider 14 and bottom wall 16. Above divider 14 is formed liquid return zone 66 as discussed hereinafter in greater detail. In the embodiment of FIG. 1, divider 14 is a single continuous panel extending from receiving end 24 to discharge end 28 of trough 12. Divider 14 has a front edge 68 spaced from front wall 22 defining a strip material inlet 70. A rear edge 72 of divider 14 is spaced from rear wall 26 of trough 12 to define a strip material outlet 74.

The apparatus 10 of the invention is suitable for contacting a strip material with a liquid to treat or coat the strip material. In preferred embodiments, the process and apparatus are for contacting a metal sheet or strip with a pickling bath to treat or clean the surface of the strip material with a pickling solution. The pickling solution can be a conventional acid or alkaline solution as known in the art.

The apparatus 10 is operated by feeding the strip material 56 into inlet area 70 of receiving end 24 and into the liquid bath 38. The strip material continues through liquid contact zone 64 below divider 14 to outlet 74. The advancing speed of strip material 56 in the direction of arrow 76 creates a drag and current on the liquid and draws the liquid bath 38 through the contact zone 64 toward outlet 74. This induced liquid current produces a reduced bath depth at the receiving end 24 and an increased depth at discharge end 28. The increased bath depth at the strip material outlet 74 causes the liquid to flow over the rear edge 72 of divider 14 as indicated by arrow 77 into liquid return zone 66. As shown in FIG. 1, divider 14 is positioned below the mean or average depth of liquid bath 38 to form return zone 66 separated from contact zone 64. The increased depth of the liquid carried through contact zone 64 at discharge end 28 readily flows through return zone 66 back to the receiving end 24 to sheet material inlet 70 where the average bath depth is generally lower to maintain a more uniform liquid bath depth through the length of trough 12.

In a preferred embodiment shown in FIGS. 1 and 2, apparatus 10 includes a cover 78 to enclosed trough 12. As shown in FIG. 2, cover 78 has a top wall 80 and side walls 82 which are supported on side walls 18 and 20 of trough 12. End walls 84 of cover 78 are dimensioned to provide an opening 86 at the receiving 24 and an opening 88 and the discharge end 28 of trough 12.

Hanger members 90 are coupled to top wall 80 of cover 78 and extend downwardly toward trough 12. As shown in FIG. 2, hanger members 90 have a substantially L-shape. Complementing L-shaped hanger members 92 extend upwardly from divider 14 to removably couple divider 14 to cover 78. In this manner, divider 14 can be lifted simultaneously with cover 78.

In preferred embodiments, hanger members 90 and 92 permit some linear up and down movement and longitudinal movement of divider 14 with respect to cover 78 and with respect to trough 12. In the embodiment shown, divider 14 hangs from cover 78 whereby an upward force on divider 14, such as that created by the strip material 56 contacting divider 14, allows divider 14 to lift upwardly and prevent damage to strip material 56 and divider 14. Cover can be suspended and supported directly by cover 78 or rest on blocks 97 in trough 14 as shown in FIG. 2 adjacent injection nozzles 94 extending through side walls 18 and 20.

Liquid injection nozzles 94 are also connected to pipe 52 for injecting liquid into contact zone 64 below divider 14. Preferably, injection nozzles 94 inject the liquid at an angle against the advancing direction of strip material 56. This reduces, the dragging effect caused by the advancing strip material, increases mixing of the liquid and reduces the depth of the bath at the discharge end 28.

Figure 3:
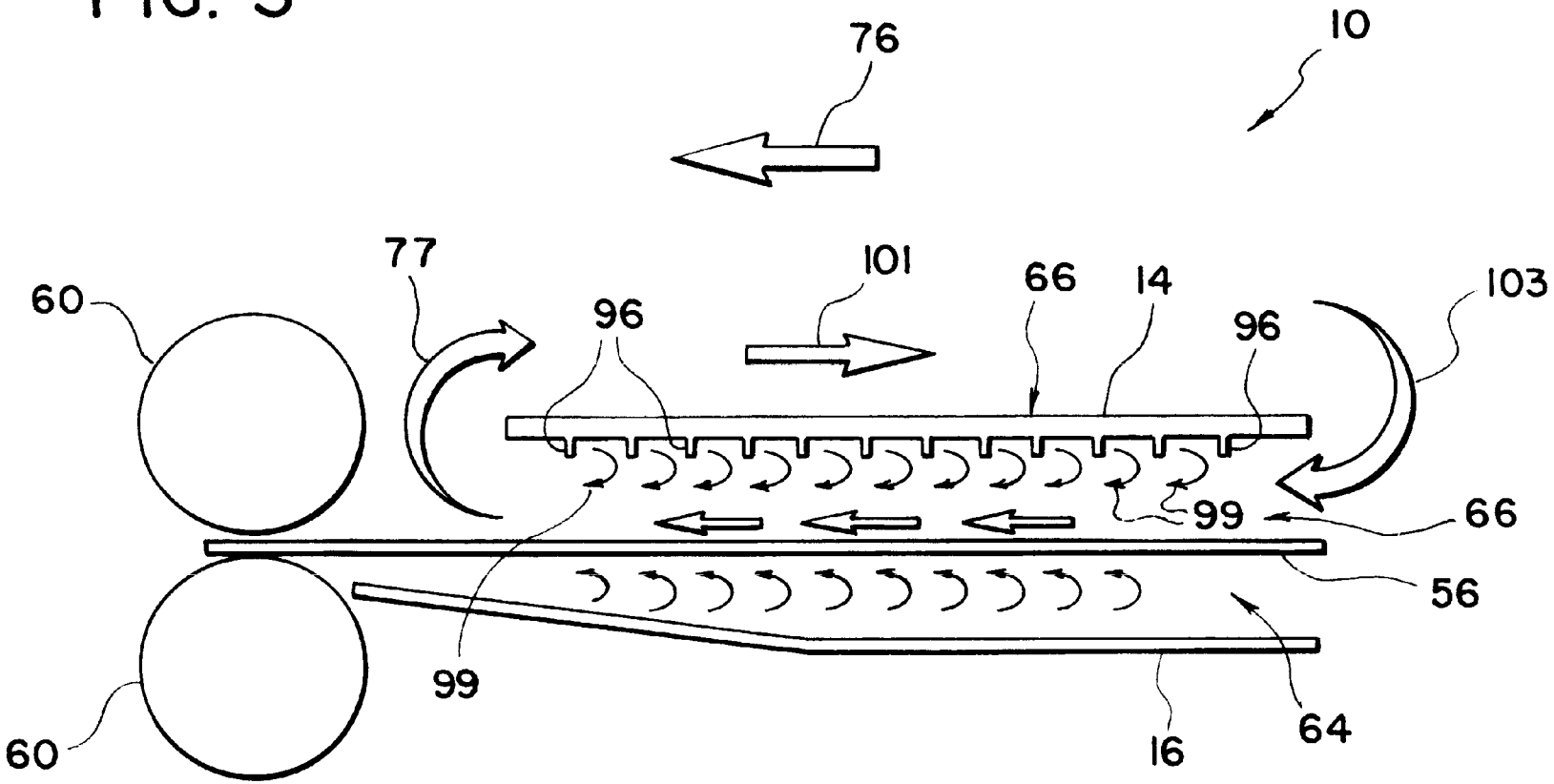
FIG. 3 is a schematic side view of the apparatus showing the liquid flow around the divider in the tank.

In preferred embodiments, divider 14 includes a plurality of bars or fins 96 extending substantially perpendicular from a bottom surface 98 thereof. Fins 96 extend substantially side to side and transverse to the advancing direction of strip material 56 and the induced current of liquid through contact zone 64. As shown in FIG. 3, fins 96 are spaced apart to create turbulence as indicated by arrows 99 in the flow of liquid and decrease the speed of the liquid current passing through contact zone 64. The treating liquid is carried to the rear end 72 of divider 14 and into return zone 66 as shown by arrows 77 and 101. The treating liquid then flows back into the receiving end 70 as indicated by arrow 103.

Separation of the contact zone 64 and a return flow zone 66 is advantageous in obtaining a carefully directed supply of fresh treatment liquid by feeding the liquid through inlet nozzles 94 at the sides of the tank and under the divider by the force of the injection nozzles 54. Fresh treating liquid is fed through nozzles 54, 94, preferably at the strip inlet area, so that the freshly supplied treatment liquid first runs alongside the strip first before circulating back in the trough 12 through the return flow zone 66 formed by the divider 14.

Positioning divider 14 in the treatment tank creates improved return flow of the treatment liquid dammed up, from the strip outlet area 74 back to the strip inlet area 70, so that the liquid depth at the strip outlet area 74 is lowered. This enables the mean bath depth to be reduced which increased efficiency and reduces operating costs. A further advantage of the divider 14 is that it forms the contact zone 64 as a channel with a small bath depth, thus keeping the surface of the liquid bath open and uses the dragging effect of the strip for circulation and mixing of the liquid bath in the processing trough.

In one preferred embodiment, the divider 14 contacts side walls 18, 20 and extends almost the entire length of the trough 12 and the only fluid communication areas between the return zone 66 and the contact zone 64 through which the treating liquid can flow are located at the beginning and the end of the trough. In this way, all of the treatment liquid is directed from the strip outlet area 74 back to the strip entry area 70 through the return zone 66.

Figure 4:
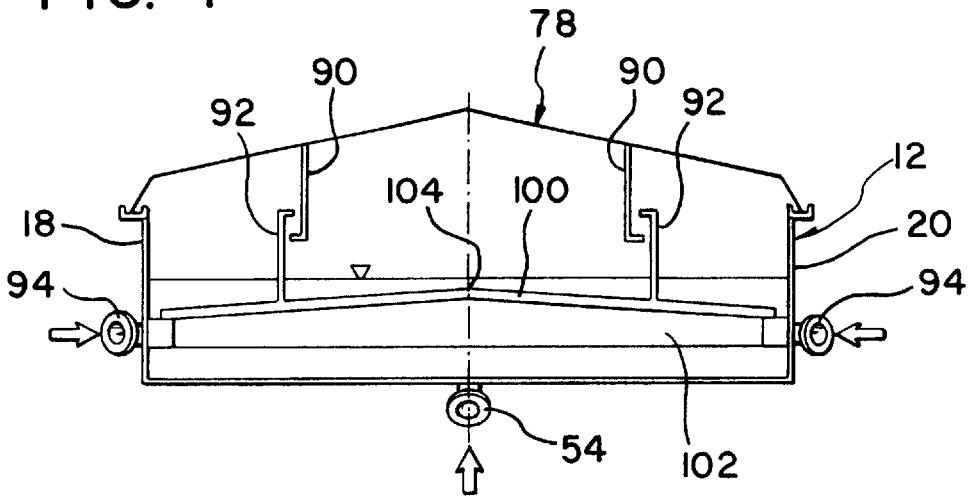
FIG. 4 is a cross-sectional end view showing an alternative embodiment of the divider.

In an alternative embodiment shown in FIG. 4, apparatus 10 includes a divider 100 having a substantially upwardly directed chevron or inverted V-shape. A plurality of fins 102 extend downwardly from the divider 100. The V-shape of divider 100 has an apex 104 which extends in the longitudinal direction of trough 12. The V-shape of divider 100 improves drainage of the liquid in the liquid return zone above the divider 100. In addition, the V-shape reduces the contact area of the strip material with the divider 100 and the fins 102. The remaining components of the apparatus are as shown in FIGS. 1 and 2 and are identified by the same reference numbers.

Figure 5:
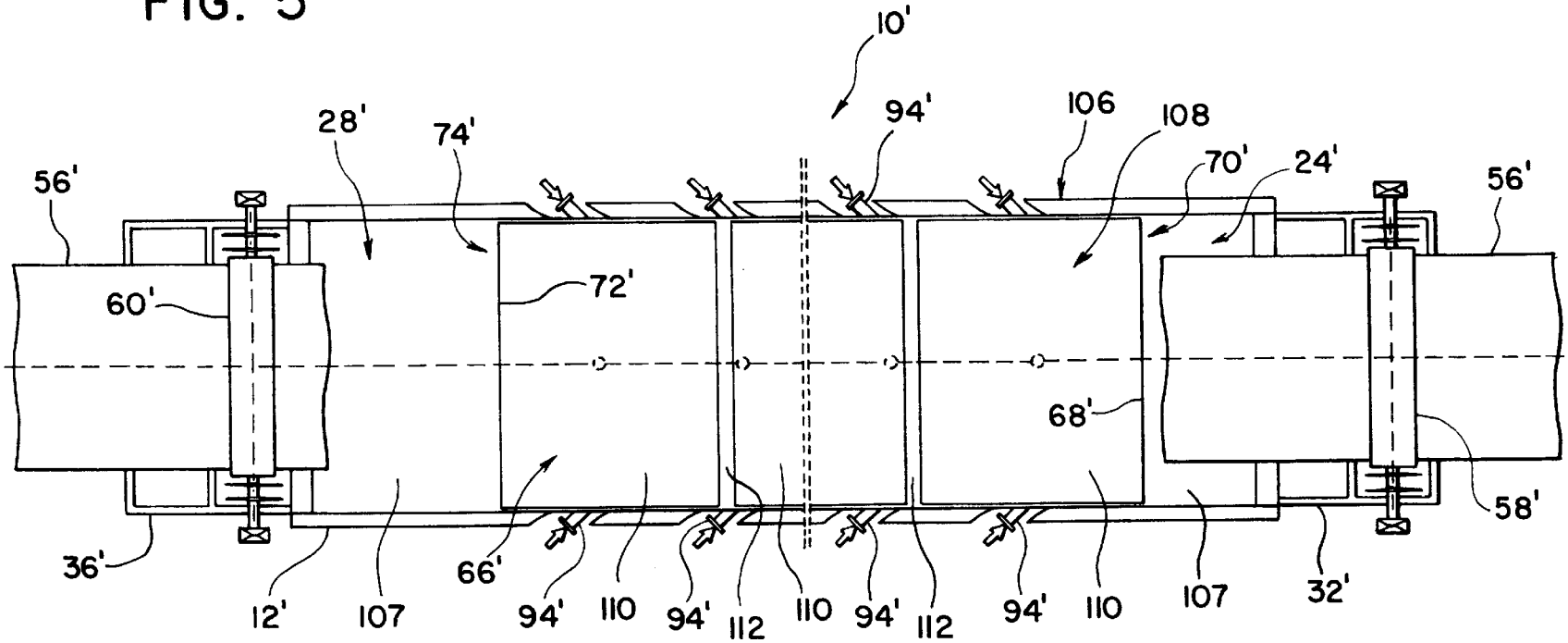
FIG. 5 is a top plan view of the apparatus showing a further alternative embodiment of the divider.

A further embodiment is illustrated in FIG. 5 where the treating tank 106 is substantially the same as in the embodiment of FIG. 1, but divider 108 is made up of a plurality of smaller individual panels 110. The identical structural elements in the embodiment of FIG. 5 are identified by the same reference number with the addition of a prime. Panels 110 are supported in the liquid bath substantially parallel to the bottom 107 of tank 106. Preferably, panels 110 are disposed in the same plane and spaced apart a distance to form gaps 112 between adjacent panels 110. Gaps 112 allow the liquid to pass freely between the return zone above the panels 110 and the contact zone below the panels in the tank 106. Sheet material 56' is fed into trough 12' through the contact zone 64' below the panels 110. The treating liquid drawn into the contact zone 64' creates an increase in fluid pressure toward the rear end 72' of each panel 110 which causes the treating liquid to flow from the contact zone 64' through the gaps 112 into the return zone 66' above the panels 110 where the liquid then flows back toward the front edge 68' of panels 110 and to the sheet material inlet 70'. The direction of flow of the treating liquid through the gaps 112 depends on the pressure difference between the contact zone 64' and the return zone 66'.

Figure 6:
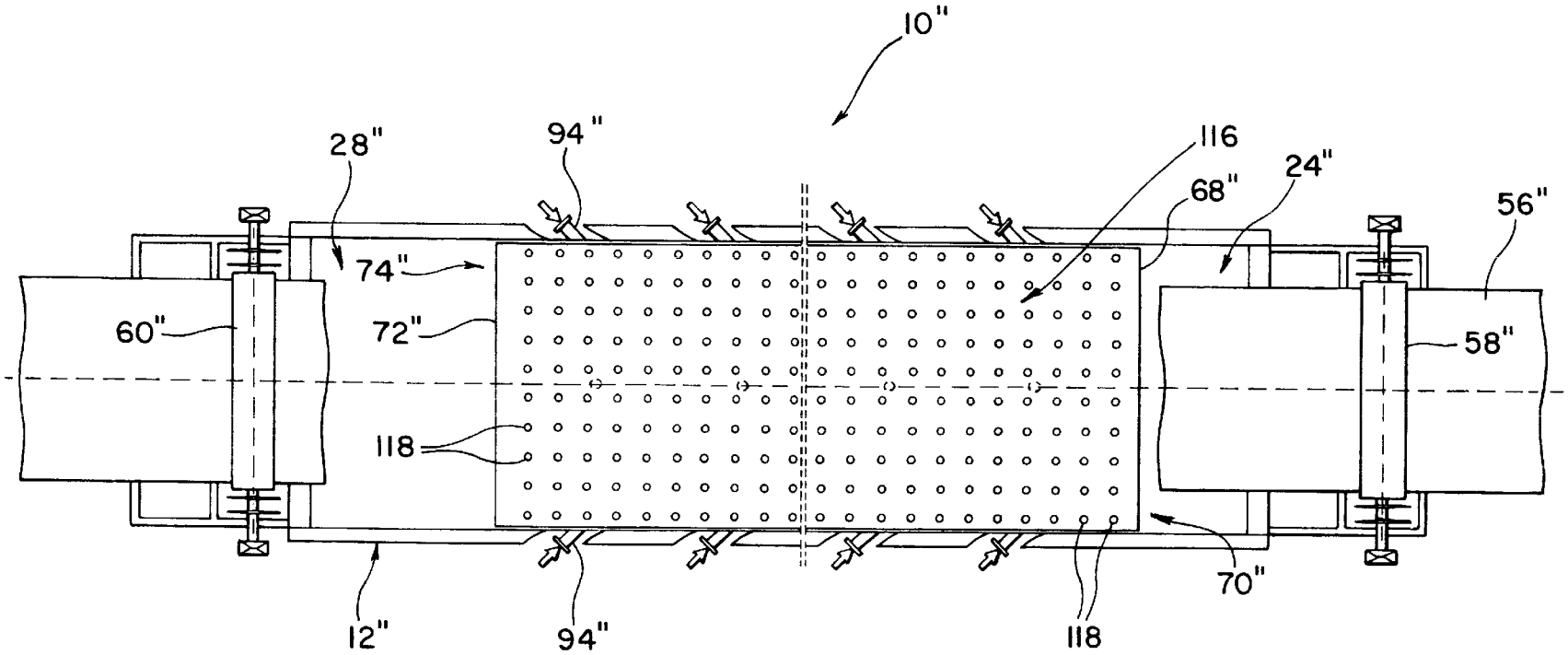
FIG. 6 is a top plan view of the apparatus showing another alternative embodiment of the divider.

In a further embodiment shown in FIG. 6, apparatus 114 is similar to the embodiment of FIG. 1 except that divider 116 in the form of a panel has a plurality of holes 118 spaced across the width and along the length of the divider 116. The various elements identical to those of the embodiment of FIG. 1 are indicated by the same reference numbers with the addition of a double prime. The holes 118 in divider allow liquid to pass between the return zone 66" and the contact zone 64". The holes 118 also provide circulation of the liquid and assist in drainage of the tank. The treating liquid flows through the holes 118 in the same manner as through gaps 112 of the embodiment of FIG. 5.

In the embodiment illustrated, the divider extends substantially the width of the trough and contacts the side walls. This substantially prevents the passage of liquid around the sides of the divider and directs the liquid along the length of the divider toward the receiving end of the trough. In preferred embodiments, the divider is movable with respect to the trough, although in alternative embodiments the divider can be attached to the side walls of the trough. In alternative embodiments, openings or spaces can be provided along the side edges of the divider to provide liquid circulation and passage between the liquid return zone and the contact zone.

Although several embodiments have been chosen to illustrate the invention, it will be readily understood by those skilled in the art that various modifications can be made without departing from the scope of the invention as set forth in the following claims.

What is claimed is:

1. An apparatus for immersing a strip material in a liquid bath, the apparatus comprising:

a trough having a longitudinal dimension with a bottom wall, first and second side walls, a strip material receiving end and a strip material discharge end, said trough being dimensioned to receive a treating liquid and contain a liquid bath; and at least one panel mounted within said trough and submerged in the liquid bath, said at least one panel having a bottom surface spaced from said bottom wall of said trough for defining a contact zone between said panel and bottom wall of said trough and extending substantially the length of said trough, said at least one panel further having a top surface defining a return zone for receiving liquid from said discharge end of said trough and directing said liquid along said top surface from said discharge end to said receiving end of said trough;

wherein said at least one panel extends substantially a length of said trough from said receiving end to said discharge end, and extends from said first side wall to said second side wall to separate said contact zone from said return zone.

2. The apparatus of claim 1, further comprising a strip material feed device for feeding a strip material to said trough and for conveying said strip material from said receiving end through said contact zone to said discharge end of said trough.

3. The apparatus of claim 1, further comprising a cover enclosing said trough.

4. The apparatus of claim 3, wherein said cover is coupled to said at least one panel whereby said at least one panel is raised by raising said cover.

5. The apparatus of claim 1, wherein said at least one panel is substantially parallel to a direction of travel of the strip material through said contact zone.

6. The apparatus of claim 1, wherein said at least one panel contacts said first and second side walls to prevent liquid from passing between said at least one panel and said first and second side walls.

7. The apparatus of claim 1, wherein said at least one panel includes a plurality of holes therein for forming liquid passages between said contact zone and said return zone.

8. The apparatus of claim 1, wherein said at least one panel has a substantially V-shaped cross-section.

9. The apparatus of claim 1, further comprising a plurality of spaced-apart fins extending from said at least one panel into said contact zone.

10. The apparatus of claim 9, wherein said fins extend substantially perpendicular to said at least one panel, and are disposed substantially transverse to said longitudinal dimension of said trough.

11. The apparatus of claim 1, further comprising a plurality of fluid inlets disposed in said side walls of said trough for directing treating liquid into said contact zone.

12. The apparatus of claim 11, further comprising at least one fluid inlet disposed in said bottom wall of said trough for directing treating liquid into said contact zone.

13. The apparatus of claim 1, further comprising at least one fluid inlet in said trough for directing treating liquid into said contact zone in a direction against an advancing direction of said strip material at an angle with respect to said longitudinal dimension of said trough.

14. The apparatus of claim 1, wherein said at least one panel is movable away from said contact zone by contact with said strip material.

15. The apparatus of claim 14, further comprising a cover for closing said trough, and wherein said at least one panel is coupled to and supported by said cover.

16. An apparatus for immersing a strip material in a liquid bath, the apparatus comprising:

a trough having a longitudinal dimension with a bottom wall, first and second side walls, a strip material receiving end and a strip material discharge end, said trough being dimensioned to receive a treating liquid and contain a liquid bath;

a plurality of panels mounted within said trough and submerged in the liquid bath, said at least one panel having a bottom surface spaced from said bottom wall of said trough for defining a contact zone in said trough, said at least one panel further having a top surface defining a return zone for receiving liquid from said discharge end of said trough and directing said liquid along said top surface from said discharge end to said receiving end of said trough; and said panels being spaced apart along a length of said trough and being spaced apart a distance to define a liquid passage between said contact zone and said return zone.

17. An apparatus for immersing a strip material in a liquid bath, the apparatus comprising:

a trough containing a liquid bath, said trough having a longitudinal dimension, first and second side walls, a bottom wall, and a first end wall at a strip material receiving end and a second end wall at a discharge end for said strip material;

a divider positioned in said trough extending substantially parallel to said bottom wall and defining a contact zone in a bottom section of said trough and a liquid return zone in an upper section of said trough for directing liquid from said discharge end to said receiving end of said trough, wherein said divider extends from said first side wall to said second side wall to separate said contact zone from said return zone; and a feed device for feeding strip material from said receiving end to said discharge end through said contact zone.

18. The apparatus of claim 17, wherein said divider includes a plurality of holes therein for forming a liquid passage between said contact zone and said return zone.

19. The apparatus of claim 17, wherein said divider has a substantially V-shaped cross-section.

20. The apparatus of claim 17, further comprising a plurality of spaced-apart fins extending substantially perpendicular to said divider, and disposed substantially transverse to said longitudinal dimension of said trough.

21. The apparatus of claim 17, further comprising a plurality of fluid inlets disposed in said side walls of said trough for directing treating liquid into said contact zone.

22. The apparatus of claim 21, further comprising at least one fluid inlet disposed in said bottom wall of said trough for directing treating liquid substantially upward into said contact zone.

23. The apparatus of claim 17, further comprising at least one fluid inlet in said trough for directing treating liquid into said contact zone in a direction against an advancing direction of said strip material and at an angle with respect to said longitudinal dimension of said trough.

24. The apparatus of claim 17, further comprising a cover for enclosing said trough and being coupled to said divider, wherein said divider is movable away from said contact zone by contact with said strip material.

25. An apparatus for immersing a strip material in a liquid bath, said apparatus comprising:

a trough containing a liquid bath and having a longitudinal dimension, first and second side walls, a bottom wall, and a first end wall at a strip material receiving end and a second end wall at a discharge end for said strip material;

a divider comprising a plurality of panels positioned in said trough defining a contact zone and a liquid return zone for directing liquid from said discharge end to said receiving end of said trough, wherein said panels are substantially parallel to said bottom wall;

said panels being spaced apart along said longitudinal dimension of said trough and being spaced apart a distance to define a liquid passage between said treating zone and said return zone; and a feed device for feeding strip material from said receiving end to said discharge end through said contact zone.

26. A process for contacting a strip material with a liquid bath, comprising the steps of feeding a strip material to a receiving end of a trough and directing said strip material to a discharge end of the trough, wherein said trough contains a liquid bath between said receiving and discharge ends, said trough including a divider extending from said receiving end to said discharge end and contacting opposite side walls of said trough for preventing liquid from passing between said divider and side walls for defining a strip material contact zone in a bottom section of said trough and a liquid return zone in a top section of said trough;

conveying said strip material through said contact zone and creating a current of said liquid through said contacting zone from said receiving end to said discharge end of said trough;

directing said current of liquid at said discharge end to said return zone and returning said liquid to said receiving end of said trough; and discharging said material strip from said discharge end of said trough.

27. The process of claim 26, further comprising injecting a liquid into said contacting zone in a direction counter to an advancing direction of said strip material.

28. The process of claim 26, further comprising injecting a liquid into said contact zone in a substantially upward direction toward said strip material.

29. The process of claim 26, wherein said divider includes a plurality of holes and said process comprises transferring liquid between said return zone and said contact zone.

30. The process of claim 26, wherein said strip material is a metal strip and said liquid is a pickling bath, and said process comprises pickling said metal strip.

31. The process of claim 26, comprising providing a plurality of holes in said divider and forming a liquid passage between said contacting zone and said return zone.

32. The process of claim 26, wherein said divider has a substantially V-shaped cross-section.

33. The process of claim 26, further comprising providing a plurality of spaced-apart fins extending substantially perpendicular from said divider, and disposed substantially transverse to said longitudinal dimension of said trough.

34. A process for contacting a strip material with a liquid bath comprising the steps of feeding a strip material to a receiving end of a trough and directing said strip material to a discharge end of said trough, wherein said trough contains a liquid bath between said receiving and discharge ends, said trough including a divider defining a strip material contact zone in a bottom section of said trough and a liquid return zone in a top section of said trough;

wherein said divider comprises a plurality of panels spaced apart along a length of said trough, said panels being spaced apart a distance to define a liquid passage between said contacting zone and said return zone;

conveying said strip material through said contact zone and creating a current of said liquid through said contacting zone from said receiving end to said discharge end;

directing said current of liquid at said discharge end to said return zone and returning said liquid to said receiving end; and discharging said material strip from said discharge end of said trough.

*35. An apparatus for immersing a strip material in a liquid bath, the apparatus comprising:*

*a trough containing a liquid bath, said trough having a longitudinal dimension, first and second side walls, a bottom wall, and a first end wall at a strip material receiving end and a second end wall at a discharge end for said strip material;*

*a divider positioned in said trough extending substantially parallel to said bottom wall and defining a contact zone in a bottom section of said trough and a liquid return zone in an upper section of said trough for directing liquid from said discharge end toward said receiving end of said trough in a substantially unidirectional flow, wherein said divider comprises a plurality of spaced-apart panels, said divider extending between said receiving end and said discharge end and extending from said first side wall to said second side wall to separate said contact zone from said return zone; and*

*a feed device for feeding strip material from said receiving end to said discharge end through said contact zone.*

*36. The apparatus of claim 35, wherein said divider is substantially solid without holes.*

*37. An apparatus for contacting a strip material in a liquid bath, the apparatus comprising:*

*a trough having a longitudinal dimension with a bottom wall and first and second side walls, a receiving end and a discharge end, said trough being dimensioned to receive a treating liquid and contain a liquid bath;*

*a strip material conveying device for conveying a strip through said trough,*

*a plurality of spaced-apart panels extending substantially from said receiving end to said discharge end of said trough, each of said panels mounted within said trough and submerged in the liquid bath, each of said panels having a top surface, a bottom surface, a receiving end and a discharge end, said bottom surface being spaced from said bottom wall of said trough for defining a contact zone in said trough and directing said liquid in a substantially unidirectional flow from a receiving end of said contact zone to a discharge end of said contact zone by movement of said strip though said contact zone, said top surface of said panel defining a return zone for receiving liquid from said discharge end of said contact zone and directing said liquid along said top surface from said discharge end in a substantially unidirectional flow to said receiving end of said contact zone; and*

*said panels being spaced apart a distance to define a gap which allows liquid to flow from said contact zone through said gap into said return zone above said panel, and as a result of fluid pressure said liquid flows back towards said receiving end of said trough.*

*38. The apparatus of claim 37, further comprising a cover for closing said trough, wherein said panels are coupled to and suspended by said cover.*

*39. The apparatus of claim 37, wherein said panels are solid panels without openings.*

*40. The apparatus of claim 37, wherein said panels extend between said side walls of said trough to separate said contact zone from said return zone.*

*41. The apparatus of claim 37, wherein said discharge end of said panels is substantially parallel to said receiving end of an adjacent panel.*

*42. A process for contacting a strip material with a liquid bath comprising the steps of*

*feeding a strip material to a receiving end of said liquid bath in a trough and directing said strip material to a discharge end of said liquid bath, wherein said bath includes a plurality of panels spaced apart along a length of said liquid bath substantially from said receiving end to said discharge end, each of said panels having a top surface, a bottom surface, a receiving end and a discharge end, each said panel forming a contact zone below said panel and a return zone above said panel, said panels being spaced apart a distance to define a gap between adjacent panels;*

*conveying said strip material through said contact zone and creating a substantially unidirectional flow of said liquid through said contact zone from said receiving end to said discharge end of each of said panels, and directing at least a portion of liquid at said discharge end of said contact zone through said gap to said return zone and directing said liquid back in a substantially unidirectional flow toward said receiving end of said panel; and*

*discharging said material strip from said downstream end of said liquid bath.*

*43. The process of claim 42, wherein each of said panels are solid panels without openings.*

*44. The process of claim 42, wherein said panels extend between said side walls of said trough for preventing liquid from passing between said panels and said side walls between said contact zone and said return zone.*

*45. An apparatus for contacting a strip material in a liquid bath, the apparatus comprising:*

*a trough having an open top end with first and second side walls, and a bottom wall, said trough containing a liquid bath for contacting a strip material;*

*a cover member for closing said open top end of said trough;*

*a plurality of panels coupled to and suspended by said cover, each said panels being positioned in said liquid bath spaced from said bottom wall and defining a contact zone between each of said panels and said bottom wall of said trough, each of said panels having a receiving end defining a receiving end of said contact zone and a discharge end defining a discharge end of said contact zone, each of said panels further defining a liquid return zone above a respective panel for directing liquid from said discharge end of said panel to said receiving end of said panel, wherein said panels extend between said first side wall and said second side wall to separate said contact zone from said return zone, said panels being spaced-apart a distance to define a gap therebetween; and*

*a feed device for feeding a strip material from said receiving end to said discharge end through each of said contact zones thereby producing a substantially unidirectional flow of liquid through said contact zone from said receiving end of each of said panels to said discharge end of each of said panels, and producing a substantially unidirectional flow of said liquid from said discharge end of each of said panels through said return zone to said receiving end of said panels, said feed device further producing a fluid pressure in said contact zone to direct a flow of liquid through said gap to said return zone and back towards said receiving end of each of said panels.*

*46. The apparatus of claim 45, wherein said panels are spaced apart along a length of said trough between a receiving end of said trough and a discharge end of said trough.*

* * * * *